(12) United States Patent
Caldwell

(10) Patent No.: US 7,048,140 B1
(45) Date of Patent: May 23, 2006

(54) VENTED LIQUID CONTAINMENT DEVICE

(75) Inventor: Rodney M. Caldwell, Pawnee, OK (US)

(73) Assignee: Brunswick Corporation, Lake Forest, IL (US)

( * ) Notice: Subject to any disclaimer, the term of this patent is extended or adjusted under 35 U.S.C. 154(b) by 88 days.

(21) Appl. No.: 10/734,845

(22) Filed: Dec. 12, 2003

(51) Int. Cl.
*B65D 51/16* (2006.01)

(52) U.S. Cl. ............ 220/371; 220/303; 220/366.1; 215/308

(58) Field of Classification Search ............ 220/303, 220/371, 366.1, 367.1; 215/307, 314, 308
See application file for complete search history.

(56) References Cited

U.S. PATENT DOCUMENTS

| | | | | | |
|---|---|---|---|---|---|
| 340,650 | A | * | 4/1886 | Young | 220/303 |
| 2,298,938 | A | * | 10/1942 | Griffin, Jr. et al. | 220/373 |
| 2,675,886 | A | * | 4/1954 | McMullen | 55/507 |
| 3,216,148 | A | * | 11/1965 | Amberg | 43/55 |
| 3,861,557 | A | | 1/1975 | Tupper | 220/373 |
| 3,961,724 | A | * | 6/1976 | Kapsy | 220/371 |
| 4,130,222 | A | * | 12/1978 | Ono | 220/373 |
| 4,285,440 | A | * | 8/1981 | Adams | 220/202 |
| 4,392,584 | A | | 7/1983 | Bauer | 220/374 |
| 4,396,583 | A | * | 8/1983 | LeBoeuf | 422/301 |
| 4,637,919 | A | * | 1/1987 | Ryder et al. | 422/300 |
| 4,646,947 | A | * | 3/1987 | Stull | 222/397 |
| 4,738,370 | A | * | 4/1988 | Urmston et al. | 215/307 |
| 4,747,502 | A | * | 5/1988 | Luenser | 215/307 |
| 4,884,716 | A | * | 12/1989 | Steiner | 220/202 |
| 4,896,789 | A | | 1/1990 | Federspiel | 220/367 |
| 4,909,408 | A | * | 3/1990 | Kos | 220/203.11 |
| 4,971,219 | A | * | 11/1990 | Dombeck et al. | 220/303 |
| 5,152,419 | A | * | 10/1992 | Yanagi | 220/374 |
| 5,174,463 | A | * | 12/1992 | Scharrer | 220/203.26 |
| 5,197,620 | A | * | 3/1993 | Gregory | 215/307 |
| 5,460,285 | A | | 10/1995 | Harding, Sr. | 220/203 |
| 5,649,639 | A | * | 7/1997 | Dolvet et al. | 220/257.1 |
| 5,727,707 | A | * | 3/1998 | Wickland et al. | 220/288 |
| 5,785,196 | A | * | 7/1998 | Montgomery | 215/354 |
| 5,911,332 | A | * | 6/1999 | Wickland et al. | 220/288 |
| 5,988,426 | A | * | 11/1999 | Stern | 220/371 |
| 6,000,534 | A | * | 12/1999 | Koomruian, Jr. | 206/5.1 |
| 6,010,029 | A | | 1/2000 | Wang | 220/714 |
| 6,015,444 | A | * | 1/2000 | Craft et al. | 55/320 |
| 6,089,390 | A | * | 7/2000 | Druitt et al. | 215/252 |
| 6,123,212 | A | * | 9/2000 | Russell et al. | 215/330 |
| 6,196,409 | B1 | | 3/2001 | Lake et al. | 220/371 |
| 6,202,870 | B1 | * | 3/2001 | Pearce | 215/307 |
| 6,274,209 | B1 | * | 8/2001 | Pagidas et al. | 428/35.7 |

(Continued)

*Primary Examiner*—Nathan J. Newhouse
*Assistant Examiner*—James Smalley
(74) *Attorney, Agent, or Firm*—William D. Lanyi

(57) ABSTRACT

A vented liquid containment device has a cup member located within the structure of a threaded cap so that a filter material can be placed within the cup member to prevent liquids from being splashed in an upward direction into contact with a vent that is formed within an inside portion of the cap. When used in conjunction with a marine vessel, rough water can cause oil within an oil reservoir to splash upwardly and come into contact with the vent opening which is intended to allow air and other gases to pass back and forth between the cavity of the reservoir and the atmosphere. The presence of the filter material prevents the liquids from being splashed into direct contact with the vent openings which could otherwise allow oil to spill outwardly onto surfaces of the reservoir and nearby components.

18 Claims, 4 Drawing Sheets

U.S. PATENT DOCUMENTS

| | | | |
|---|---|---|---|
| 6,375,028 B1 * | 4/2002 | Smith | 220/258.1 |
| 6,447,565 B1 * | 9/2002 | Raszkowski et al. | 55/385.4 |
| 6,585,128 B1 * | 7/2003 | Clevenger et al. | 220/303 |
| 6,619,499 B1 * | 9/2003 | Lin | 220/371 |
| 6,659,297 B1 * | 12/2003 | Gregory et al. | 215/252 |
| 6,679,395 B1 * | 1/2004 | Pfefferkorn et al. | 215/307 |
| 6,866,056 B1 * | 3/2005 | Scott | 137/15.18 |
| 2003/0234254 A1 * | 12/2003 | Grybush et al. | 220/366.1 |

* cited by examiner

VENTED LIQUID CONTAINMENT DEVICE

BACKGROUND OF THE INVENTION

1. Field of the Invention

The present invention is generally related to a vented liquid containment device and, more particularly, to a cap that provides a vented opening while inhibiting the flow of liquid through the vented opening.

2. Description of the Prior Art

Those skilled in the art are familiar with many types of caps and lids for enclosing containers. In many applications, it is necessary to provide a means for venting the contents of the container to atmospheric pressure. The venting can serve the purpose of allowing air to flow into the container to replace decreased volume which occurs as a result of using a liquid that is stored within the container. The venting can also serve the purpose of allowing gas to flow either into or out of the container in response to temperature change which can expand or contract the contents within the container.

U.S. Pat. No. 6,196,409, which issued to Lake et al. on Mar. 6, 2001, describes a venting means and, more particularly, a container, or a cap for a container for viscous liquid products. The container or the cap comprises a venting element. The venting element allows passage of gases between the interior and exterior of the container when the pressure inside the container differs from the external ambient pressure. The container or cap further includes a control feature which controls the phase separation of the products splashed onto the membrane.

U.S. Pat. No. 4,896,789, which issued to Federspiel on Jan. 30, 1990, describes an anti-leak fuel cap liner. A vented fuel cap is adapted to be removably attached to a filler neck of a fuel tank of the type commonly employed with small internal combustion engines. The vented fuel cap comprises a generally cylindrical cap that is formed with inner threads, and is adapted to be threadedly engaged with the filler neck. A liner element is provided to fit within the cap, and is seated along the underside of the top of the cap. The liner element includes an axially inwardly-directed film-shaped diaphragm portion that includes a slit formed substantially in its center. The cap and liner element allow for bi-directional venting of the fuel tank. The inwardly-directed dome-shaped diaphragm portion of the liner element allows outside air to vent into the fuel tank at a considerably smaller pressure differential than that required to vent outwardly from the interior of the tank.

U.S. Pat. No. 5,460,285, which issued to Harding on Oct. 24, 1995, describes a pressure relief venting lid. The lid is intended for sealing an opening and providing pressure regulation of a container. The lid has a support plate attached by four angularly spaced spring assemblies to a port cover for sealing a filler opening in a manway cover for the container. The support plate overlies the port cover for fixedly supporting the spring assemblies and cover while protecting the springs and cover from impact or shock. The spring assemblies are disposed between the support plate and port cover for sealing the cover against the opening and allowing the cover to unseat from the opening to regulate the pressure within the container. The spring assemblies are offset equal distances from the center of the port cover to minimize bending moments that the cover may be subjected to. The generally circular port cover has a convex dished portion for strengthening the port cover to maintain the seal with the opening while under load.

U.S. Pat. No. 6,010,029, which issued to Wang on Jan. 4, 2000, describes a container lid assembly. The lid assembly includes a lid body having a periphery containing a liquid discharge slot and an air vent arranged diametrically opposite to each other and a center containing a passage located between the liquid discharge slot and the air vent. It also comprises a rotary cap rotatably mounted on top of the lid body and including a drive post extending downward from the bottom thereof, and extending through the passage, a control device mounted on the bottom of the lid body and secured to the drive post to rotate with it. In such a manner, the control device can be rotated by the drive post to move between a first position where the liquid discharge slot and the air vent are closed by the control device and a second position where the liquid discharge slot and the air vent are detached from and opened by the control device.

U.S. Pat. No. 4,392,584, which issued to Bauer on Jul. 12, 1983, describes a vent cap for a container accommodating hydraulic fluids. A vent cap for a container of housing which accommodates a hydraulic operating medium is described. The vent cap includes a housing type cover which has labyrinth walls. The cover is adapted to be closed by a base insert which includes a vent passage. The vent cap is adapted to be mounted on a vent opening of the container or housing. The housing type cover is rotatably mounted on the base insert.

U.S. Pat. No. 3,861,557, which issued to Tupper on Jan. 21, 1975, describes a vent cap. A cap for a fuel tank such as is used with gasoline engines for chain saws, power mowers, snowmobiles and the like, which require venting of the tank without danger of fuel leakage resulting from return flow through the vent passageway is described. The cap has a plastic body in which is molded vent apparatus including the complete vent passageway and a check relief valve that is encapsulated within the passageway.

The patents described above are hereby expressly incorporated by reference in the description of the present invention.

One of the main problems that is inherent in any vented cap for a liquid container relates to the fact that it is usually undesirable to allow the liquid itself to pass through the vent openings. The flow of liquid from within the container through the vent openings can occur in at least two ways. The most obvious is when the container is tipped over to allow the liquid to directly contact the vent opening. It can then flow out of the container through the vent opening as a result of gravity. Another way in which the liquid within the container can escape from the container through the vent opening is when the container is subjected to shock loads that can cause the liquid to violently splash within the internal cavity of the container to the degree that liquid can become airborne with sufficient energy so as to accumulate near, and within, the vent openings and eventually flow out of the container through the vent openings.

The latter problem described immediately above can occur when the container is used to hold oil on a marine vessel. If the marine vessel is traveling on rough waters, it can be subjected to sufficient shock loading to cause the oil within the container to become airborne and splash around the inside of the container with sufficient energy to contact the internal openings of the vents. This, in turn, can cause oil to seep through the openings and into the interior of the marine vessel surrounding the oil container. It would therefore be significantly beneficial if a container of this type could be adequately vented without allowing liquid to escape through the vents when the liquid is subjected to sufficient shock loads to cause it to become airborne and rise upwardly within the cavity of the container.

SUMMARY OF THE INVENTION

A vented liquid containment device, made in accordance with a preferred embodiment of the present invention, comprises a cap having a top portion and a generally cylindrical side portion. A thread structure is formed on an inner surface of the generally cylindrical side portion and a vent is formed within a preselected portion of the cap. A cup member is shaped to be received within an inner portion of the cap and a flange extends in a radially outward direction from the cup member. The flange is shaped to be received within the cap at a position proximate an inner surface of the top portion. A fluid passage is formed through a surface of the cup member and is disposed in fluid communication with the vent. Filter material is disposed within the internal cavity of the cup member.

The vent comprises a slot formed in a preselected portion of the cap. The cup member comprises a tapered side surface in a preferred embodiment of the present invention, whereby a first end of the cup member has a larger diameter than a second end of the cup member. The first end is disposed in contact with the inner surface of the top portion and the second end extends away from the cap.

The present invention can further comprise a reservoir having a neck which is threaded to receive the thread structure in attaching relation between the neck and the cap. The reservoir is an oil reservoir in a preferred embodiment of the present invention. The present invention can further comprise a seal disposed within the cap, wherein the flange is disposed between the top portion of the cap and the seal. In a preferred embodiment of the present invention, the filter material is an expanded fiber mesh material which is available in commercial quantities, under the name "Super Polish Pad", from the 3M Corporation. A version of this pad is identified as the "4100 White Super Polish Pad" by the 3M Corporation and is available in many different sizes. Although this product is primarily intended for use in polishing floors, it has been found that it also serves the useful purpose of acting as a filter material in conjunction with the present invention.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Figure 1:
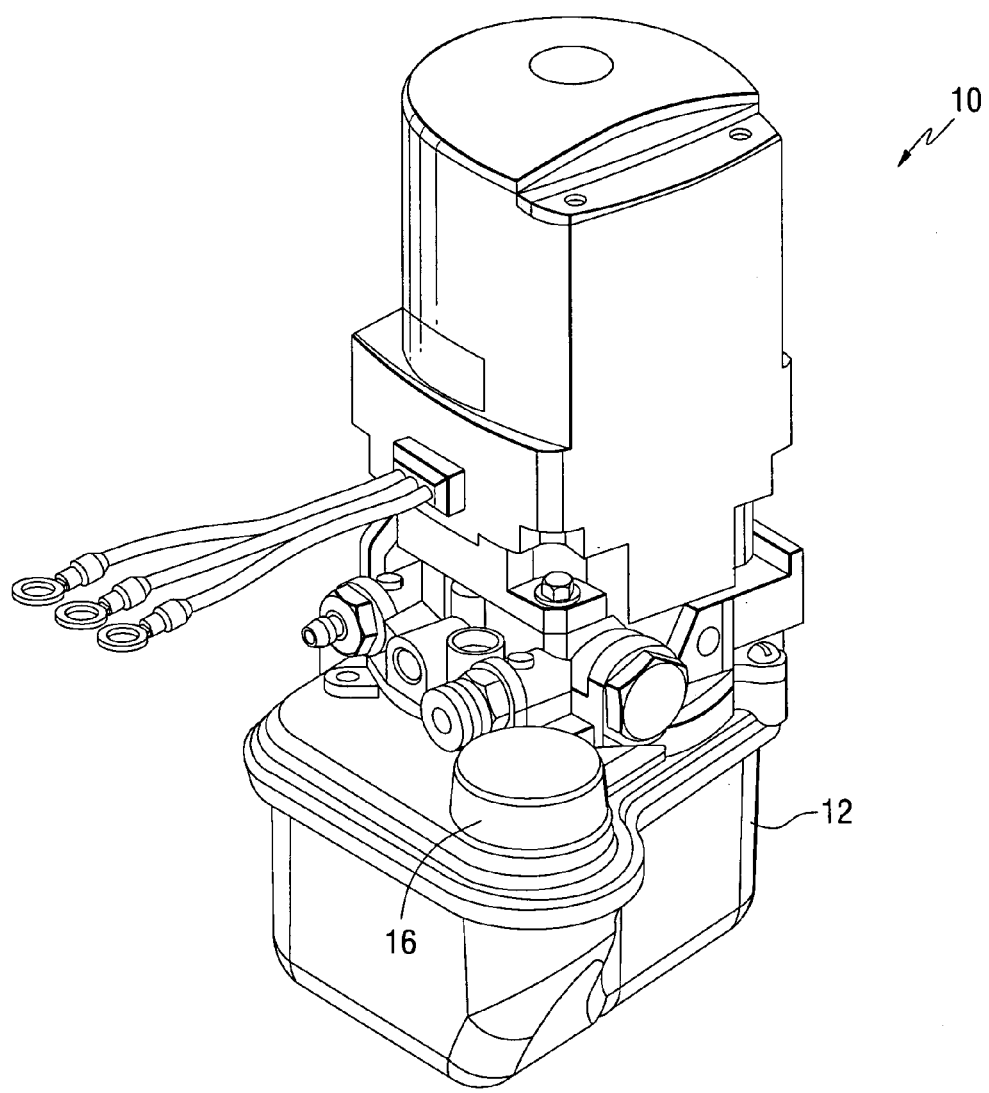
FIG. 1 shows a power trim pump assembly with a reservoir and a cap on the reservoir.

Throughout the description of the preferred embodiment of the present invention, like components will be identified by like reference numerals.

FIG. 1 shows a power trim pump 10 of the type that is used on many types of marine propulsion systems. The pump provides hydraulic pressure for the cylinders of a power trim system that, in turn, is used to change the position of an outdrive of a stern drive system relative to the transom of a marine vessel. A reservoir 12 contains a quantity of oil for use by the pump. The reservoir has a neck that provides an opening for the reservoir 12. A cap 16 is used to close that opening. In order to allow the pressure within the reservoir 12 to remain generally equal to the ambient pressure surrounding the power trim pump 10, vents are provided in the cap 16 which allow gases, such as air, to pass back and forth between the space within the reservoir 12 and the atmosphere.

When used in a marine application, the power trim pump 10 and the reservoir 12 shown in FIG. 1 can be subjected to sufficiently strong shock loads to cause the oil within the reservoir 12 to become airborne and splash into contact with the vents. When this occurs, liquid can pass through the vents and be deposited on external surfaces of the reservoir 12 and nearby components. However, when a cap 16 made in accordance with the present invention is used in cooperation with the reservoir 12, this deleterious result is avoided.

Figure 2:
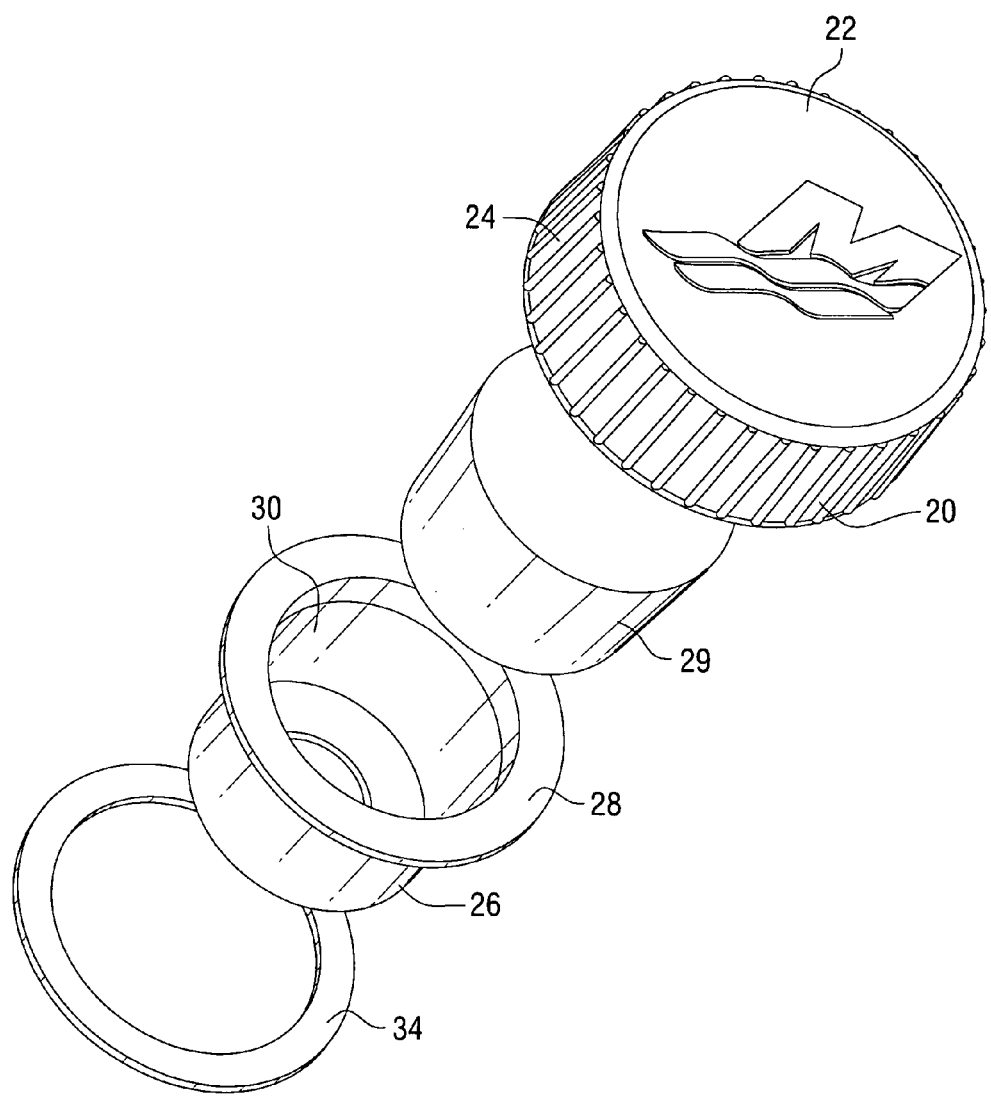
FIG. 2 is an isometric exploded view of a cap made in accordance with the preferred embodiment of the present invention.

FIG. 2 is an exploded isometric view of a vented liquid containment device made in accordance with the preferred embodiment of the present invention. It comprises a cap 20 which has a top portion 22 and a generally cylindrical side portion 24. A cup member 26 is shaped to be received within an inner portion of the cap 20. A flange 28 extends in a radially outward direction from the cup member 26 and is shaped to be received within the cap 20 proximate an inner surface of the top portion 22. A filter material 29 is disposed within an internal cavity 30 of the cup member 26. A seal 34 is also disposed within the cap 20 with the flange 28 being located between the top portion of the cap 20 and the seal 34.

Figure 3:
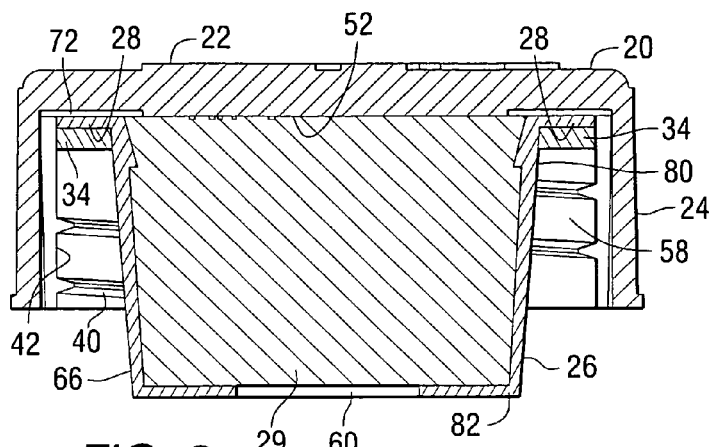
FIG. 3 is a section view taken through an assembled cap made in accordance with the preferred embodiment of the present invention.
Figure 4:
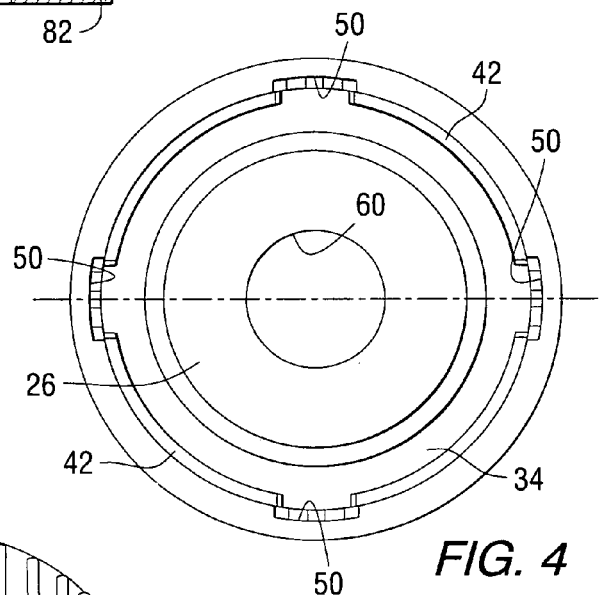
FIG. 4 is a bottom view of the cap shown in FIG. 3.
Figure 5:
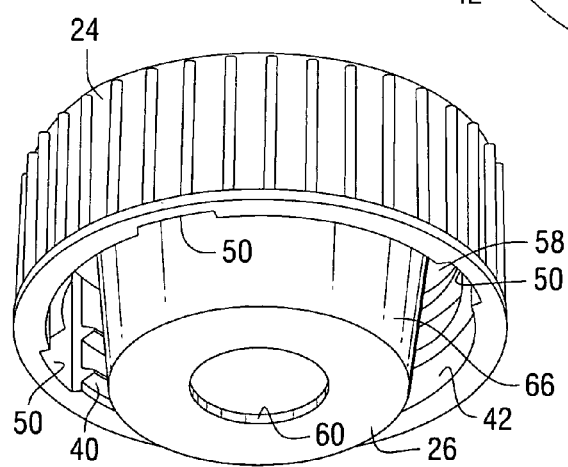
FIG. 5 is an isometric view of an assembled cap made in accordance with the preferred embodiment of the present invention.

FIG. 3 is a section view of an assembled cap made in accordance with the preferred embodiment of the present invention. FIG. 4 is a bottom view of the cap and FIG. 5 is an isometric view of the assembled cap made in accordance with the preferred embodiment of the present invention.

With references to FIGS. 2–5, it can be seen that a vented liquid containment device made in accordance with the preferred embodiment of the present invention comprises a cap 20 which has a top portion 22 and a generally cylindrical side portion 24. A thread structure 40 is formed on an inner surface 42 of the generally cylindrical side portion 24. A vent 50 is formed within a preselected portion of the cap 20. In FIG. 4, it can be seen that the vent comprises four slots that are formed within the inner surface of the generally cylindrical side portion 42. These slots are also formed partially in the inner surface 52 of the top portion 22. The cup member 26 is shaped to be received within an inner portion 58 of the cap 20. The flange 28 extends in a radially outward direction from the cup member 26 and is shaped to be received within the cap 20 at a position proximate the inner surface 52 of the top portion 22.

With continued reference to FIGS. 2–5, a fluid passage 60 is formed through a surface of the cup member 26 and is disposed in fluid communication with the vent 50. More specifically, fluids can pass upwardly or downwardly through the fluid passage 60, through the filter material 29, and through the vent 50. Because of the presence of the filter material 29, gases can pass in either direction along this fluid path while fluids are generally stopped by the filter material 29 from passing upwardly from within the cavity of the reservoir toward the vent 50. The filter material 29, as shown in FIG. 3, is disposed within an inner cavity of the cup member 26.

With continued reference to FIGS. 2–5, it can be seen that the cup member 26 comprises a tapered side surface 66. As a result, a first end 80 of the cup member 26 has a larger diameter than a second end 82. The first end 80 is disposed in contact with the inner surface 52 of the top portion 22, as illustrated in FIG. 3. The second end 82 extends away from the cap 20.

In a manner that is very well known to those skilled in the art, the reservoir 12, illustrated in FIG. 1, has a neck that is threaded to receive the thread structure 40 in attaching relation between the neck and the cap 16. Although the neck is not visible in FIG. 1 because of the presence of the cap 16, the use of a neck to define an opening of a reservoir 12 and the provision of threads on the neck to receive a cap 16 is very well known to those skilled in the art and will not be described in greater detail herein.

In a preferred embodiment of the present invention, the reservoir 12 is an oil reservoir. A preferred embodiment of the present invention can further comprise a seal 34 disposed within the cap 20. The flange 28 of the cup member 26 is disposed between the top portion 22 of the cap 20 and the seal 34. More specifically, the flange 28 is disposed between the inner surface 52 of the top portion 22 and the seal 34.

With reference to FIGS. 4 and 5, the slots of the vent 50 are formed in a generally axial direction in the inner surface 42 of the generally cylindrical side portion 24 and also partially in the inner surface 52 of the top portion 22. This provides the necessary fluid communication between the cavity of the cup member 26, where the filter material 29 is disposed, and a position external to the cup member 26 through the thread structure 40. As a result, gases, such as air, can pass through the fluid passage 60, the filter material 29, and the vent 50 to flow back and forth between the internal cavity of the reservoir 12 and the atmosphere. The presence of the filter material 29 prevents liquid from splashing upwardly into contact with the vent 50. When the marine vessel is subjected to rough water and the resulting shock loads inherent with this condition, the liquid within the reservoir 12, such as oil, can splash upwardly against the outer surfaces of the cup member 26 and into the fluid passage 60, but further travel of the liquid is inhibited because of the presence of the filter material 29. As a result, oil cannot splash upwardly into direct contact with the vent 50. After the shock loading subsides, the oil captured by the filter material 29 can flow downwardly, as a result of gravity, back into the reservoir 12.

Figure 6:
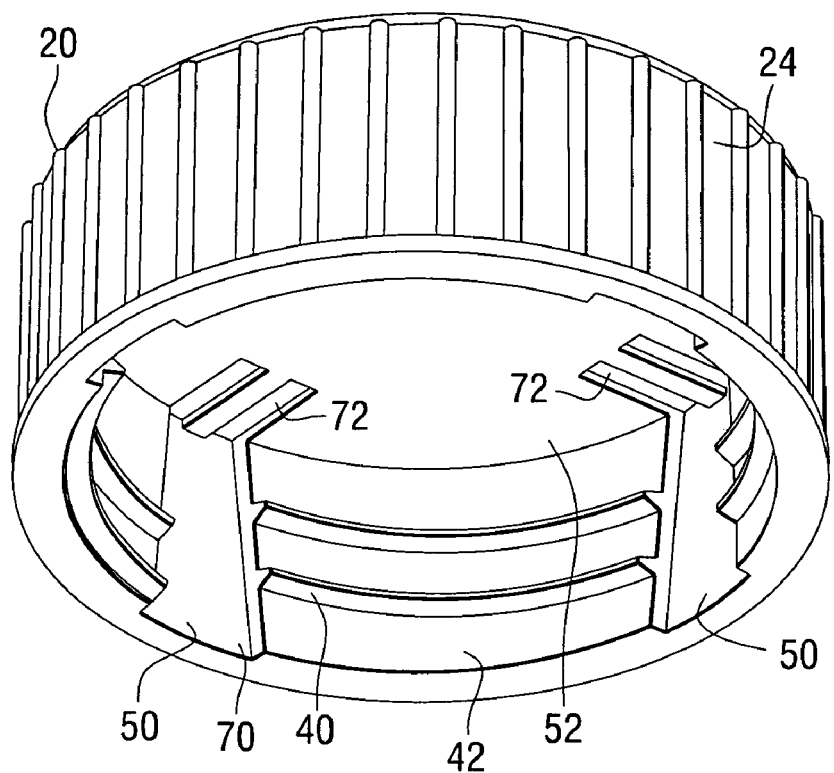
FIG. 6 is an isometric view of the cap of the present invention without a cup member or filter material disposed therein.

FIG. 6 is an isometric view of the cap 20 which more clearly shows the shape of the vent 50. In a preferred embodiment of the present invention, the vent 50 comprises a first slot 70 which is formed in the inner surface 42 of the generally cylindrical side portion 24. The vent 50 also comprises a second slot 72 that is formed in the inner surface 52 of the top portion of the cap 20. The first slot portion 70 is generally perpendicular to the second slot portion 72.

Figure 7:
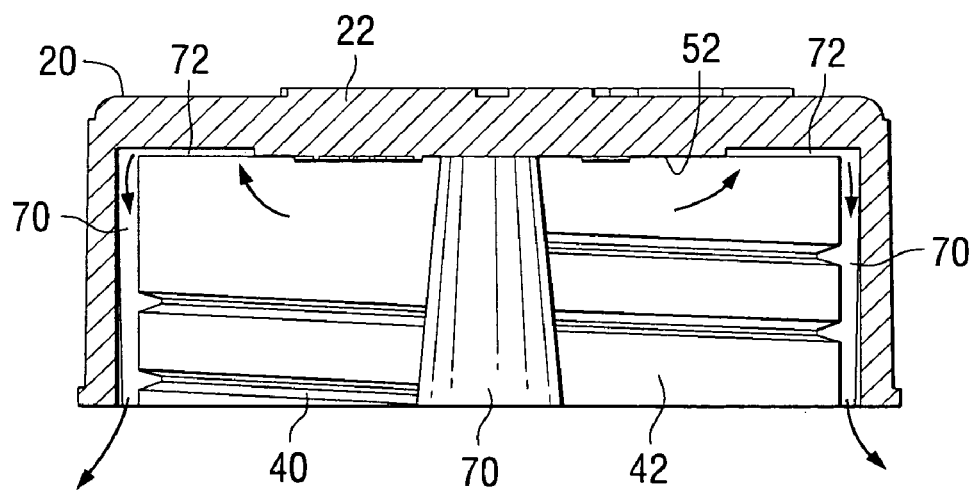
FIG. 7 is a section view of a cap made in accordance with the present invention without a cup member or filter material disposed therein.

FIG. 7 is a section view of the cap 20 without the cup member 26 or the filter material 29 disposed within the inner portion of the cap 20. The first slot portion 70 is shown extending in a generally parallel manner with the axis of symmetry of the cap 20. The second slot portion 72 is shown formed along radial paths in the inner surface 52 of the top portion 22. The second slot portion 72 extends radially inwardly along the inner surface 52 of the top portion 22 far enough to extend past the flange 28 of the cup member 26. FIG. 3 also shows the slots. This allows gases to escape, along the path represented by the arrows in FIG. 7, from the internal portion of the reservoir 12 to the atmosphere. The passage of these gases from the reservoir to the atmosphere, through the vent 50, occurs after they pass upwardly through the filter material 29. This flow of gas from the internal cavity of the reservoir 12 to the atmosphere first passes through the fluid passage 60, which is an opening formed through the wall of the cup member 26, and then through the filter material 29 and vent 50.

As described above, it can be seen that the present invention provides an inexpensive vented liquid containment device which prevents liquid from flowing outwardly through the vents from within the reservoir when subjected to vertical shock. However, the present invention also allows a free flow of gases in both directions between the internal cavity of the reservoir and the atmosphere.

Although the present invention has been described with considerable detail and illustrated to show a specific preferred embodiment, it should be understood that alternative embodiments are also within its scope.

I claim:

1. A vented liquid containment device, comprising:
   a cap having a top portion and a generally cylindrical side portion;
   a thread structure formed on an inner surface of said generally cylindrical side portion;
   a vent formed within a preselected portion of said cap;
   a cup member shaped to be received within an inner portion of said cap;
   a flange extending in a radially outward direction from said cup member beyond a radially innermost portion of said thread structure and shaped to be received within said cap at a position proximate an inner surface of said top portion, said flange being retained in position relative to said cap by said thread structure;
   a fluid passage formed through a surface of said cup member, said fluid passage being disposed in fluid communication with said vent, said vent comprising a slot formed in said inner surface of said generally cylindrical side portion and said inner surface of said top portion; and
   filter material disposed within an internal cavity of said cup member.

2. The device of claim 1, wherein:
   said cup member comprises a tapered side surface, whereby a first end of said cup member has a larger diameter than a second end of said cup member.

3. The device of claim 2, wherein:
   said first end is disposed in contact with said inner surface of said top portion.

4. The device of claim 3, wherein:
   said second end extends away from said cap.

5. The device of claim 1, further comprising:
   a reservoir having a neck, said neck being threaded to receive said thread structure in attaching relation between said neck and said cap.

6. The device of claim 5, wherein:
   said reservoir is an oil reservoir.

7. The device of claim 1, further comprising:

a seal disposed within said cap, said flange being disposed between said top portion of said cap and said seal.

8. The device of claim 1, wherein:

said filter material comprises a polishing pad.

9. A vented liquid containment device, comprising:

a cap having a top portion and a generally cylindrical side portion;

a thread structure formed on an inner surface of said generally cylindrical side portion;

a vent formed within a preselected portion of said cap;

a cup member shaped to be received within an inner portion of said cap;

a flange extending in a radially outward direction from said cup member and shaped to be received within said cap at a position proximate an inner surface of said top portion, said flange being retained in position within said cap by a radially innermost portion of said thread structure;

a fluid passage formed through a surface of said cup member, said fluid passage being disposed in fluid communication with said vent;

filter material disposed within an internal cavity of said cup member; and a seal disposed within said cap, said flange being disposed between said top portion of said cap and said seal, said vent comprising a slot formed in said inner surface of said generally cylindrical side portion and said inner surface of said top portion.

10. The device of claim 9, wherein:

said cup member comprises a tapered side surface, whereby a first end of said cup member has a larger diameter than a second end of said cup member.

11. The device of claim 10, wherein:

said first end is disposed in contact with said inner surface of said top portion.

12. The device of claim 11, wherein:

said second end extends away from said cap.

13. The device of claim 12, further comprising:

a reservoir having a neck, said neck being threaded to receive said thread structure in attaching relation between said neck and said cap.

14. The device of claim 13, wherein:

said reservoir is an oil reservoir.

15. The device of claim 14, wherein:

said filter material is an expanded foam.

16. A vented liquid containment device, comprising:

a cap having a top portion and a generally cylindrical side portion;

a thread structure formed on an inner surface of said generally cylindrical side portion;

a vent formed within a preselected portion of said cap;

a cup member shaped to be received within an inner portion of said cap;

a flange extending in a radially outward direction from said cup member and shaped to be received within said cap at a position proximate an inner surface of said top portion, said flange being retained in position within said cap by a radially innermost portion of said thread structure;

a fluid passage formed through a surface of said cup member, said fluid passage being disposed in fluid communication with said vent, said vent comprising a slot formed through said thread structure in said inner surface of said generally cylindrical side portion and said inner surface of said top portion;

filter material disposed within an internal cavity of said cup member; and a seal disposed within said cap, said flange being disposed between said top portion of said cap and said seal; and a reservoir having a neck, said neck being threaded to receive said thread structure in attaching relation between said neck and said cap.

17. The device of claim 16, wherein:

said vent comprises a slot formed in said inner surface of said generally cylindrical side portion and said inner surface of said top portion, said cup member comprising a tapered side surface, whereby a first end of said cup member has a larger diameter than a second end of said cup member, said first end being disposed in contact with said inner surface of said top portion, said second end extending away from said cap.

18. The device of claim 17, wherein:

said reservoir is an oil reservoir.

* * * * *